US012631549B2

(12) United States Patent
Furuya et al.

(10) Patent No.: US 12,631,549 B2
(45) Date of Patent: May 19, 2026

(54) NOISE REDUCTION GAS SENSOR AND GAS MEASUREMENT METHOD

(71) Applicant: Asahi Kasei Microdevices Corporation, Tokyo (JP)

(72) Inventors: Takaaki Furuya, Tokyo (JP); Yoshihiko Koizumi, Tokyo (JP); Yuta Takagi, Tokyo (JP); Naoya Ugomori, Tokyo (JP); Naoya Iwata, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 306 days.

(21) Appl. No.: 18/611,692

(22) Filed: Mar. 21, 2024

(65) Prior Publication Data

US 2024/0328927 A1 Oct. 3, 2024

(30) Foreign Application Priority Data

Mar. 28, 2023 (JP) ................................. 2023-052302
Jan. 26, 2024 (JP) ................................. 2024-010427

(51) Int. Cl.
*G01N 21/17* (2006.01)
(52) U.S. Cl.
CPC . *G01N 21/1702* (2013.01); *G01N 2021/1704* (2013.01)
(58) Field of Classification Search
CPC ............. G01N 27/4077; G01N 27/127; G01N 27/125; G01N 27/4071; G01N 27/407; G01N 21/3504; G01N 27/4075; G01N 27/4074; G01N 27/419; G01N 27/4067;

G01N 33/0037; G01N 27/409; G01N 27/41; G01N 33/004; G01N 27/16; G01N 33/0006; G01N 33/0009; G01N 27/128; G01N 27/4045; G01N 33/0027; G01N 33/0031; G01N 27/404; G01N 33/005; G01N 27/4078; G01N 33/0047; G01N 27/4141; G01N 27/4073; G01N 27/00;
(Continued)

(56) References Cited

U.S. PATENT DOCUMENTS 5,753,797 A 5/1998 Forster et al.
6,006,585 A * 12/1999 Forster ............... G01N 21/1702
73/24.01
(Continued)

FOREIGN PATENT DOCUMENTS

CN 107148566 A * 9/2017 ............. G01N 21/31
EP 4534978 A1 * 4/2025 ........... G01N 29/036
(Continued)

*Primary Examiner* — Andre J Allen
(74) *Attorney, Agent, or Firm* — KENJA IP LAW PC

(57) ABSTRACT

A gas sensor (1) includes a gas measuring unit (40) including a light source (11) provided on a substrate, a detector (41) provided on the substrate and configured to detect a signal based on light emitted from the light source, and a gas detection space (42) provided with a hole for gas to pass through. The natural frequency of a resonance mode of the gas measuring unit is f, and the driving frequency of the light source is from 0.9f or more to 1.1f or less. A distribution of sound pressure is generated in the gas detection space by driving of the light source, and the light source and the detector are each arranged in a region that is 70% or more of the maximum absolute value of the sound pressure.

18 Claims, 7 Drawing Sheets

(58) Field of Classification Search
CPC ........... G01N 27/4175; G01N 33/0036; G01N 27/126; G01N 33/007; G01N 21/1702; G01N 27/4072; G01N 27/417; G01N 27/4062; G01N 27/4065; G01N 27/416; G01N 27/123; G01N 2021/1704; G01N 33/0054; G01N 33/497; G01N 27/18; G01N 27/4163; G01N 27/122; G01N 21/01; G01N 21/783; G01N 27/30; G01N 33/0016; G01N 21/61; G01N 21/031; G01N 27/4162; G01N 27/4076; G01N 27/129; G01N 2291/021; G01N 27/04; G01N 29/022; G01N 27/26; G01N 27/14; G01N 21/39; G01N 25/18; G01N 33/0062; G01N 29/036; G01N 27/301; G01N 33/0004; G01N 27/124; G01N 2027/222; G01N 33/0014; G01N 33/00; G01N 27/4143; G01N 21/0303; G01N 33/0044; G01N 27/4146; G01N 33/0073; G01N 2291/02809; G01N 2291/0256; G01N 21/31; G01N 33/0011; G01N 33/0063; G01N 27/413; G01N 33/006; G01N 29/2425; G01N 21/274; G01N 29/222; G01N 27/308; G01N 33/0013; G01N 21/314; G01N 27/121; G01N 1/24; G01N 27/403; G01N 33/0032; G01N 2021/0112; G01N 2291/014; G01N 21/05; G01N 27/227; G01N 31/223; G01N 33/0039; G01N 2201/0636; G01N 2201/0221; G01N 2291/0215; G01N 27/40; G01N 27/221; G01N 33/0034; G01N 33/0042; G01N 27/304; G01N 27/414; G01N 21/27; G01N 27/406; G01N 21/7703; G01N 1/2273; G01N 33/0022; G01N 27/22; G01N 29/2418; G01N 33/0072; G01N 33/0059; G01N 21/255; G01N 2201/062; G01N 15/0656; G01N 27/226; G01N 29/02; G01N 21/03; G01N 27/02; G01N 33/225; G01N 2021/399; G01N 33/0067; G01N 2021/3513; G01N 1/22; G01N 21/45; G01N 27/041; G01N 2201/1211; G01N 33/0008; G01N 2291/0423; G01N 27/4148; G01N 27/045; G01N 33/4975; G01N 25/32; G01N 33/0075; G01N 21/3518; G01N 21/15; G01N 2291/0255; G01N 2201/08; G01N 2291/0426; G01N 2021/1708; G01N 21/33; G01N 33/2841; G01N 21/359; G01N 29/30; G01N 27/026; G01N 25/20; G01N 31/10; G01N 33/02; G01N 2201/061; G01N 27/49; G01N 2201/0696; G01N 27/185; G01N 33/4972; G01N 21/17; G01N 27/223; G01N 5/02; G01N 1/2252; G01N 27/3278; G01N 2015/0046; G01N 21/80; G01N 27/333; G01N 1/2205; G01N 33/0068; G01N 27/307; G01N 15/06; G01N 33/4925; G01N 2021/458; G01N 21/77; G01N 27/27; G01N 2201/06113; G01N 2291/0427; G01N 25/30; G01N 21/554; G01N 29/326; G01N 2021/158; G01N 29/024; G01N 27/028; G01N 21/3151; G01N 2021/8578; G01N 21/553; G01N 29/32; G01N 21/37; G01N 21/41; G01N 21/171; G01N 33/0029; G01N 21/6428; G01N 33/0026; G01N 21/643; G01N 2021/772; G01N 21/8507; G01N 27/046; G01N 2021/0346; G01N 21/65; G01N 2201/0612; G01N 21/59; G01N 31/224; G01N 2201/127; G01N 25/22; G01N 27/28; G01N 27/74; G01N 21/35; G01N 29/2437; G01N 33/0024; G01N 33/025; G01N 31/22; G01N 1/405; G01N 27/228; G01N 33/0052; G01N 21/0332; G01N 2021/6432; G01N 1/44; G01N 31/221; G01N 21/25; G01N 2291/101; G01N 27/401; G01N 27/06; G01N 27/4161; G01N 27/48; G01N 2021/3166; G01N 27/66; G01N 30/66; G01N 2021/773; G01N 2021/7786; G01N 25/4873; G01N 1/2247; G01N 2291/02872; G01N 29/032; G01N 2021/3137; G01N 2021/7783; G01N 2021/317; G01N 2030/025; G01N 21/09; G01N 27/205; G01N 21/85; G01N 1/26; G01N 15/0606; G01N 25/48; G01N 2021/7773; G01N 25/00; G01N 27/4035; G01N 2021/391; G01N 2201/12761; G01N 2291/0257; G01N 2021/1793; G01N 2201/06186; G01N 29/2406; G01N 31/12; G01N 21/78; G01N 2021/052; G01N 2021/3181; G01N 29/2462; G01N 2201/084; G01N 33/0049; G01N 15/075; G01N 21/53; G01N 2201/0637; G01N 2201/12; G01N 27/31; G01N 1/38; G01N 2291/106; G01N 27/62; G01N 33/0018; G01N 2201/0627; G01N 2201/12784; G01N 2291/02863; G01N 27/64; G01N 2201/12723; G01N 2291/02818; G01N 27/225; G01N 27/626; G01N 2021/7709; G01N 29/14; G01N 7/10; G01N 2021/0378; G01N 2021/7776; G01N 25/56; G01N 27/002; G01N 27/4118; G01N 30/64; G01N 33/0001; G01N 2001/2244; G01N 21/47; G01N 21/552; G01N 21/64; G01N 2201/066; G01N 25/4893; G01N 29/348; G01N 2021/3595; G01N 2201/12792; G01N 2223/508; G01N 2291/0422; G01N 1/34; G01N 21/1717; G01N 21/63; G01N 21/8483; G01N 2201/128; G01N 27/286; G01N 27/3277; G01N 29/42; G01N 33/0065; G01N 2021/8557; G01N 2201/022; G01N 2201/068; G01N 2291/0217; G01N 2291/02881; G01N 27/048; G01N 31/225; G01N 2021/451; G01N 2021/6434; G01N 21/75; G01N 27/3335; G01N 29/00; G01N 33/0057; G01N 2021/3531; G01N 2021/775; G01N 21/6402; G01N 2201/0693; G01N 2291/02845; G01N 33/0021; G01N 7/00; G01N 1/2226; G01N 1/40; G01N 2021/058; G01N 22/00; G01N 2201/067; G01N 29/228; G01N 29/24; G01N 2021/7723; G01N 25/36; G01N 27/327; G01N 33/12; G01N 15/0205; G01N 21/658; G01N 2201/0662; G01N 2291/0212; G01N 27/283; G01N 29/4463; G01N 33/18; G01N 2021/0382; G01N 2201/023; G01N 2021/0385; G01N 2201/024; G01N 27/021; G01N 27/70;
G01N 29/2431; G01N 29/4454; G01N
33/146; G01N 1/2214; G01N 2001/245;
G01N 21/4133; G01N 21/55; G01N
21/774; G01N 2291/102; G01N 29/4427;
G01N 30/02; G01N 30/88; G01N 33/22;
G01N 33/24; G01N 33/84; G01N
2021/151; G01N 2021/3129; G01N
2021/396; G01N 2021/7759; G01N
21/21; G01N 21/84; G01N 2201/0231;
G01N 2201/1215; G01N 1/2202; G01N
2021/0106; G01N 2021/7779; G01N
21/645; G01N 21/6489; G01N 21/71;
G01N 2291/02836; G01N 29/44; G01N
2001/2276; G01N 2001/4088; G01N
2021/1706; G01N 2021/7763; G01N
21/00; G01N 21/94; G01N 2201/0873;
G01N 2201/12753; G01N 27/4167; G01N
1/2294; G01N 21/66; G01N 21/67; G01N
2201/0236; G01N 25/005; G01N
29/4436; G01N 33/0055; G01N 33/0095;
G01N 9/266; G01N 1/4077; G01N 11/08;
G01N 11/16; G01N 2001/2288; G01N
2001/4016; G01N 2021/0314; G01N
21/6408; G01N 2201/0638; G01N
2201/0686; G01N 2201/088; G01N
29/46; G01N 33/4977; G01N 37/00;
G01N 2021/3177; G01N 2021/8521;
G01N 25/488; G01N 25/62; G01N
27/043; G01N 27/07; G01N 29/22; G01N
30/12; G01N 13/00; G01N 2021/0389;
G01N 2021/7753; G01N 21/7746; G01N
2201/0228; G01N 2201/12746; G01N
27/305; G01N 27/4166; G01N
2001/2223; G01N 2021/1795; G01N
2021/3545; G01N 2021/8585; G01N
2201/0621; G01N 2201/0826; G01N
23/20; G01N 23/20091; G01N 23/2273;
G01N 27/36; G01N 27/4165; G01N
27/72; G01N 29/2443; G01N 29/323;
G01N 33/98; G01N 2021/1725; G01N
2021/4166; G01N 21/6486; G01N
2201/0233; G01N 2291/012; G01N
29/4481; G01N 33/0019; G01N 33/48;
G01N 15/00; G01N 17/04; G01N
2001/2229; G01N 2021/7793; G01N
2030/8804; G01N 21/4738; G01N
2201/12715; G01N 25/28; G01N
27/3271; G01N 27/4111; G01N 29/2468;
G01N 29/48; G01N 33/227; G01N 9/36;
G01N 1/00; G01N 2021/5903; G01N
2030/123; G01N 2030/8809; G01N
21/49; G01N 21/81; G01N 2201/0214;
G01N 2201/0634; G01N 2201/064; G01N
2201/0806; G01N 25/482; G01N 25/58;
G01N 2610/00; G01N 27/60; G01N
31/00; G01N 33/0098; G01N 2021/1727;
G01N 2021/3148; G01N 2021/3527;
G01N 2021/354; G01N 21/3586; G01N
2201/0668; G01N 2291/045; G01N
27/4115; G01N 33/1826; G01N 7/04;
G01N 1/2258; G01N 15/1459; G01N
2021/056; G01N 2021/8466; G01N
21/3577; G01N 21/648; G01N 21/766;
G01N 2201/1214; G01N 2201/1218;

G01N 2223/07; G01N 23/2251; G01N
27/42; G01N 2201/0227; G01N
2201/0631; G01N 2201/0633; G01N
2201/0683; G01N 2291/011; G01N
2291/0289; G01N 23/2055; G01N 25/16;
G01N 27/4114; G01N 27/423; G01N
2800/042; G01N 29/221; G01N 31/229;
G01N 5/00; G01N 9/002; G01N
2001/4094; G01N 2021/1751; G01N
2021/3133; G01N 2021/3185; G01N
2021/3196; G01N 2021/7769; G01N
21/412; G01N 2201/06153; G01N
2201/0632; G01N 2201/121; G01N
23/22; G01N 27/3274; G01N 27/4145;
G01N 27/605; G01N 27/68; G01N
29/4418; G01N 30/86; G01N 33/1886;
G01N 33/493; G01N 1/2208; G01N 1/28;
G01N 2001/242; G01N 2021/3155; G01N
2021/3509; G01N 2021/418; G01N
2030/3015; G01N 2030/3053; G01N
2030/3076; G01N 21/3581; G01N
2201/063; G01N 23/207; G01N 24/10;
G01N 25/4846; G01N 29/2412; G01N
30/76; G01N 33/1806; G01N 33/54373;
G01N 33/58; G01N 9/00; G01N 1/14;
G01N 17/00; G01N 2001/2261; G01N
2021/157; G01N 2021/3125; G01N
2021/6484; G01N 2021/655; G01N
2021/7713; G01N 2030/125; G01N
2030/884; G01N 21/11; G01N 21/5907;
G01N 21/5911; G01N 21/76; G01N
2201/0635; G01N 2201/0655; G01N
2201/125; G01N 2291/015; G01N
2291/02408; G01N 2291/105; G01N
2496/70; G01N 25/46; G01N 25/4833;
G01N 27/20; G01N 27/302; G01N
27/628; G01N 30/60; G01N 30/6043;
G01N 30/74; G01N 30/95; G01N
33/2852; G01N 33/96; G01N 5/04; G01N
15/1433; G01N 19/00; G01N 2001/2267;
G01N 2015/0026; G01N 2021/0162;
G01N 2021/1714; G01N 2021/3144;
G01N 2021/3522; G01N 2030/645; G01N
2035/00346; G01N 21/272; G01N 21/62;
G01N 2201/02; G01N 2201/0623; G01N
2291/02854; G01N 24/004; G01N 25/50;
G01N 27/3275; G01N 27/4117; G01N
27/4168; G01N 27/622; G01N 29/046;
G01N 29/38; G01N 30/16; G01N
30/6095; G01N 31/005; G01N 33/0045;
G01N 33/388; G01N 33/525; G01N
33/5438; G01N 35/00693; G01N 7/06;
G01N 2001/2241; G01N 2001/4066;
G01N 2009/006; G01N 2021/1734; G01N
2021/258; G01N 2021/3536; G01N
2021/394; G01N 2021/6439; G01N
2021/7756; G01N 2021/945; G01N
2030/8813; G01N 21/3103; G01N
2201/0222; G01N 2201/12707; G01N
23/2076; G01N 25/14; G01N 30/62;
G01N 33/182; G01N 33/54346; G01N
35/00584; G01N 35/00871; G01N 1/286;
G01N 11/00; G01N 15/08; G01N
2001/2264; G01N 2001/2291; G01N
2015/0007; G01N 2021/0168; G01N

2021/152; G01N 2021/3192; G01N 2021/4126; G01N 2021/4173; G01N 2021/513; G01N 2021/6463; G01N 2021/7726; G01N 2021/7796; G01N 2030/008; G01N 2035/00306; G01N 21/23; G01N 21/4788; G01N 21/8422; G01N 21/9501; G01N 2201/0616; G01N 2201/06193; G01N 2201/0624; G01N 2201/0691; G01N 2201/1241; G01N 2201/126; G01N 27/005; G01N 27/411; G01N 27/44; G01N 27/447; G01N 27/76; G01N 2800/12; G01N 29/2481; G01N 29/34; G01N 30/00; G01N 30/06; G01N 30/466; G01N 30/78; G01N 33/0096; G01N 33/03; G01N 33/2025; G01N 33/222; G01N 33/28; G01N 33/49; G01N 33/52; G01N 33/54386; G01N 1/42; G01N 15/02; G01N 17/002; G01N 2001/021; G01N 2001/2232; G01N 2001/227; G01N 2001/2282; G01N 2001/247; G01N 2015/086; G01N 2021/0143; G01N 2021/0156; G01N 2021/0335; G01N 2021/1721; G01N 2021/1742; G01N 2021/1753; G01N 2021/218; G01N 2021/3159; G01N 2021/398; G01N 2021/456; G01N 2021/786; G01N 2021/8416; G01N 2030/128; G01N 21/474; G01N 21/6404; G01N 21/93; G01N 2201/0886; G01N 2201/10; G01N 2201/1247; G01N 2201/1273; G01N 2201/1296; G01N 2333/245; G01N 25/10; G01N 25/34; G01N 27/025; G01N 29/04; G01N 29/11; G01N 29/36; G01N 30/7206; G01N 33/04; G01N 33/1813; G01N 33/245; G01N 33/2823; G01N 33/2888; G01N 33/487; G01N 5/025; G01N 7/12; G01N 7/14; G01N 1/2035; G01N 1/2211; G01N 1/4005; G01N 1/4022; G01N 15/01; G01N 15/0211; G01N 15/1023; G01N 2001/024; G01N 2001/2866; G01N 2001/386; G01N 2013/003; G01N 2015/1026; G01N 2021/0118; G01N 2021/015; G01N 2021/0193; G01N 2021/0357; G01N 2021/1736; G01N 2021/1748; G01N 2021/4742; G01N 2021/633; G01N 2021/751; G01N 2021/7736; G01N 2021/7789; G01N 2021/8514; G01N 2021/8542; G01N 2021/933; G01N 2030/8881; G01N 2035/00297; G01N 2035/00702; G01N 21/253; G01N 21/278; G01N 21/29; G01N 21/453; G01N 21/51; G01N 21/8806; G01N 21/8851; G01N 2201/06; G01N 2201/06173; G01N 2223/052; G01N 2223/509; G01N 2223/638; G01N 2291/022; G01N 2291/0235; G01N 2291/02433; G01N 2291/0253; G01N 2291/0254; G01N 23/20008; G01N 24/008; G01N 25/385; G01N 25/4866; G01N 25/66; G01N 27/023; G01N 27/92; G01N 2800/04; G01N 29/075; G01N 29/343; G01N 30/20; G01N 30/32; G01N 30/68; G01N 30/8651; G01N 33/0003; G01N 33/10; G01N 33/36; G01N 33/4875; G01N 33/48778; G01N 33/54326; G01N 33/585; G01N 33/586; G01N 35/1016; G01N 7/16; G01N 7/20; G01N 15/0618; G01N 15/0637; G01N 2001/1445; G01N 2001/2217; G01N 2001/222; G01N 2001/2297; G01N 2001/248; G01N 2015/0662; G01N 2015/1493; G01N 2021/0131; G01N 2021/0181; G01N 2021/3188; G01N 2021/414; G01N 2021/4776; G01N 2021/556; G01N 2021/8887; G01N 2030/743; G01N 2035/0406; G01N 21/13; G01N 21/276; G01N 21/3563; G01N 21/431; G01N 21/4795; G01N 21/636; G01N 21/88; G01N 21/95; G01N 2201/0218; G01N 2201/0238; G01N 2201/025; G01N 2201/065; G01N 2201/0833; G01N 2201/129; G01N 2203/0094; G01N 2223/107; G01N 2223/303; G01N 2223/418; G01N 2223/647; G01N 23/2202; G01N 25/4813; G01N 27/10; G01N 29/045; G01N 29/225; G01N 3/00; G01N 30/54; G01N 30/722; G01N 33/008; G01N 33/14; G01N 33/241; G01N 33/287; G01N 33/38; G01N 33/48785; G01N 33/4915; G01N 33/492; G01N 33/5308; G01N 33/531; G01N 33/5432; G01N 33/57505; G01N 33/5752; G01N 35/00603; G01N 35/04

See application file for complete search history.

(56)             References Cited

U.S. PATENT DOCUMENTS

| 12,287,280 | B2 * | 4/2025 | Parker | G01N 29/32 |
| 2006/0123884 | A1 | 6/2006 | Selker et al. | |
| 2008/0073536 | A1 * | 3/2008 | Willing | G01N 21/1702 |
| | | | | 250/343 |
| 2008/0196477 | A1 | 8/2008 | Van Herpen | |
| 2010/0020326 | A1 | 1/2010 | Van Kesteren | |
| 2017/0038343 | A1 | 2/2017 | Kshirsagar et al. | |
| 2019/0072489 | A1 * | 3/2019 | Camargo | H10F 77/124 |
| 2021/0349057 | A1 | 11/2021 | Tumpold | |
| 2022/0187193 | A1 | 6/2022 | Uehlinger | |
| 2022/0236230 | A1 | 7/2022 | Salzmann et al. | |
| 2024/0175804 | A1 * | 5/2024 | Meinert | G01N 21/1702 |
| 2025/0314592 | A1 * | 10/2025 | Zhao | G01N 21/7746 |

FOREIGN PATENT DOCUMENTS

| FR | 3084745 | B1 * | 10/2020 | G01N 29/343 |
| JP | S5550142 | A | 4/1980 | |
| JP | H09127066 | A | 5/1997 | |
| JP | 2008527323 | A | 7/2008 | |
| JP | 2008545134 | A | 12/2008 | |
| JP | 2022528805 | A | 6/2022 | |
| JP | 2024137507 | A * | 10/2024 | |
| JP | 2025077438 | A * | 5/2025 | |
| JP | 2025086777 | A * | 6/2025 | |
| WO | 2020212481 | A1 | 10/2020 | |
| WO | WO-2025228706 | A1 * | 11/2025 | G01N 21/1702 |

* cited by examiner

Negative    0    Positive

Sound pressure amplitude map

Node

Peak or valley

NOISE REDUCTION GAS SENSOR AND GAS MEASUREMENT METHOD

CROSS-REFERENCE TO RELATED APPLICATIONS

The present application claims priority to Japanese Patent Application No. 2023-052302 filed on Mar. 28, 2023 and Japanese Patent Application No. 2024-010427 filed on Jan. 26, 2024, the entire contents of which are incorporated herein by reference.

TECHNICAL FIELD

The present disclosure relates to a gas sensor and a gas measurement method.

BACKGROUND

Recently developed gas sensors (gas measuring apparatuses) include a light source that emits infrared light. The gas sensor is configured so that the infrared light is transmitted through a gas containing a gas to be detected, and the gas sensor and uses the characteristics of absorption, by the gas to be detected, of the infrared light in order to detect the concentration of the gas to be detected. The gas to be detected is, for example, alcohol or carbon dioxide. For example, Patent Literature (PTL) 1 discloses a photoacoustic gas sensor that measures gas concentration by using a high-performance microphone to pick up, as sound, the vibrations of gas molecules that have absorbed light.

CITATION LIST

Patent Literature

PTL 1: WO2020/212481
PTL 2: US 2021/0349057 A1

SUMMARY

Here, since the photoacoustic gas sensor picks up sound with a microphone, noise in the operating environment affects the detection accuracy. For example, PTL 2 discloses that a photoacoustic sensor with a housing structure detects acoustic information in a frequency range of 5 Hz to 25 kHz using a MEMS microphone. If there is a device such as an air conditioner in the environment where the gas sensor is used, the device may emit noise with a peak around 100 Hz, for example. Therefore, to detect the gas to be detected with high accuracy, demand exists for a gas sensor that can avoid the influence of noise. PTL 2 does not, however, examine the structural design of gas sensors and the effects of noise.

It would be helpful to provide a gas sensor and a gas measurement method capable of highly accurate detection of a gas to be detected.

[1] A gas sensor according to an embodiment of the present disclosure includes:

a gas measuring unit including a light source provided on a substrate, a detector provided on the substrate and configured to detect a signal based on light emitted from the light source, and a gas detection space provided with a hole for gas to pass through, wherein a natural frequency of a resonance mode of the gas measuring unit is f, and a driving frequency of the light source is from 0.9f or more to 1. If or less, a distribution of sound pressure is generated in the gas detection space by driving of the light source, and the light source and the detector are each arranged in a region that is 70% or more of a maximum absolute value of the sound pressure.

[2] As an embodiment of the present disclosure, in [1], in plan view looking at a main surface of the substrate in front, the light source and the detector are arranged at point symmetrical positions with respect to a center of the gas measuring unit or at line symmetrical positions with respect to a line passing through the center of the gas measuring unit, and the light source and the detector are separated by one third or more of a maximum length of the gas measuring unit in plan view.

[3] As an embodiment of the present disclosure, in [1], in plan view looking at a main surface of the substrate in front, one of the light source or the detector is arranged at a center of the gas measuring unit, and the other of the light source or the detector is arranged to be separated from the center of the gas measuring unit by a distance of at least a quarter of a maximum length of the gas measuring unit in the plan view.

[4] As an embodiment of the present disclosure, in [1], the light source is a light-emitting element with a driving frequency of 200 Hz or more.

[5] As an embodiment of the present disclosure, in [1], the natural frequency f of the resonance mode is given by Equation (1), $$f = \frac{c}{2}\sqrt{\left(\frac{n_x}{L_x}\right)^2 + \left(\frac{n_y}{L_y}\right)^2 + \left(\frac{n_z}{L_z}\right)^2} \qquad \text{Equation (1)}$$

where $L_x$, $L_y$, $L_z$ are lengths of each side of the gas measuring unit, c is the speed of sound, $n_x$, $n_y$, $n_z$ are any integer from 0 to 3, and one of $n_x$, $n_y$, $n_z$ is greater than 0.

[6] As an embodiment of the present disclosure, in [5], the lengths of each side of the gas measuring unit $L_x$, $L_y$, $L_z$ are given by Equation (2), $$L_i = \sqrt[3]{V}, i \in \{x, y, z\} \qquad \text{Equation 2}$$

where V is a volume of the gas detection space.

[7] As an embodiment of the present disclosure, in any one of [1] to [6], the gas measuring unit is a cuboid having two orthogonal sides of identical length.

[8] As an embodiment of the present disclosure, in any one of [1] to [6], the gas measuring unit is a cube.

[9] As an embodiment of the present disclosure, in [1], the gas measuring unit is cylindrical or hemispherical.

[10] As an embodiment of the present disclosure, in [9], the gas measuring unit is cylindrical, and the natural frequency f of the resonance mode is given by Equation (3), $$f = \frac{c}{2\pi}\sqrt{\left(\frac{\tau_{mi}}{R}\right)^2 + \left(\frac{n_z\pi}{L_z}\right)^2} \qquad \text{Equation (3)}$$

where $L_{ez}$ is a height and R is a radius of the gas measuring unit; c is the speed of sound; $\tau_{mi}$ is a coordinate value of a point at which an $i^{th}$ derivative, counting from 0, of a first type Bessel function of order 0 or m is 0; m, i, and $n_z$ are integers from 0 to 3; and either $\tau_{mi}$ or $n_z$ is greater than 0.

[11] As an embodiment of the present disclosure, in [9], the gas measuring unit is hemispherical, and the natural frequency f of the resonance mode is given by Equation (4), $$f = \frac{c}{2\pi} \frac{\mu_{li}}{R} \qquad \text{Equation (4)}$$

where R is a radius of the gas measuring unit, c is the speed of sound, $\mu_{li}$ is a coordinate value of a point at which an $i^{th}$ slope, counting from 0, of a spherical Bessel function of order 1 is 0, and I and i are integers from 0 to 3.

[12] As an embodiment of the present disclosure, in any one of [1] to [11], the driving frequency is 1 kHz or more.

[13] As an embodiment of the present disclosure, in any one of [1] to [12], the driving frequency is 10 kHz or more.

[14] As an embodiment of the present disclosure, in any one of [1] to [13], the detector is a microphone with a vibrating membrane, a resonance frequency of the detector is substantially identical to the driving frequency, and presence or a concentration of a gas to be detected is measured by a photoacoustic method.

[15] As an embodiment of the present disclosure, in any one of [1] to [14], the light source is a quantum light-emitting element.

[16] As an embodiment of the present disclosure, in any one of [1] to [8], the light source or the detector is located at a center or an end of a cuboid or a cube that is approximately defined with respect to the gas measuring unit.

[17] As an embodiment of the present disclosure, in any one of [9] to [11], the light source or the detector is located at a center or an end of a cylinder or a hemisphere that is approximately defined with respect to the gas measuring unit.

[18] A gas measurement method according to an embodiment of the present disclosure is a gas measurement method to be executed by a gas sensor, the gas sensor including a gas measuring unit that includes a light source provided on a substrate, a detector provided on the substrate and configured to detect a signal based on light emitted from the light source, and a gas detection space provided with a hole for gas to pass through, the gas measurement method including:

setting a driving frequency of the light source to be from 0.9f or more to 1.1f or less, f being a natural frequency of a resonance mode of the gas measuring unit, wherein in the gas sensor, a distribution of sound pressure is generated in the gas detection space by driving of the light source, and the light source and the detector are each arranged in a region that is 70% or more of a maximum absolute value of the sound pressure.

According to the present disclosure, a gas sensor capable of highly accurate detection of a gas to be detected can be provided.

BRIEF DESCRIPTION OF THE DRAWINGS

In the accompanying drawings:

FIG. 6 is a diagram illustrating the sound pressure distribution in the case of a cylinder.

DETAILED DESCRIPTION

Figure 1:
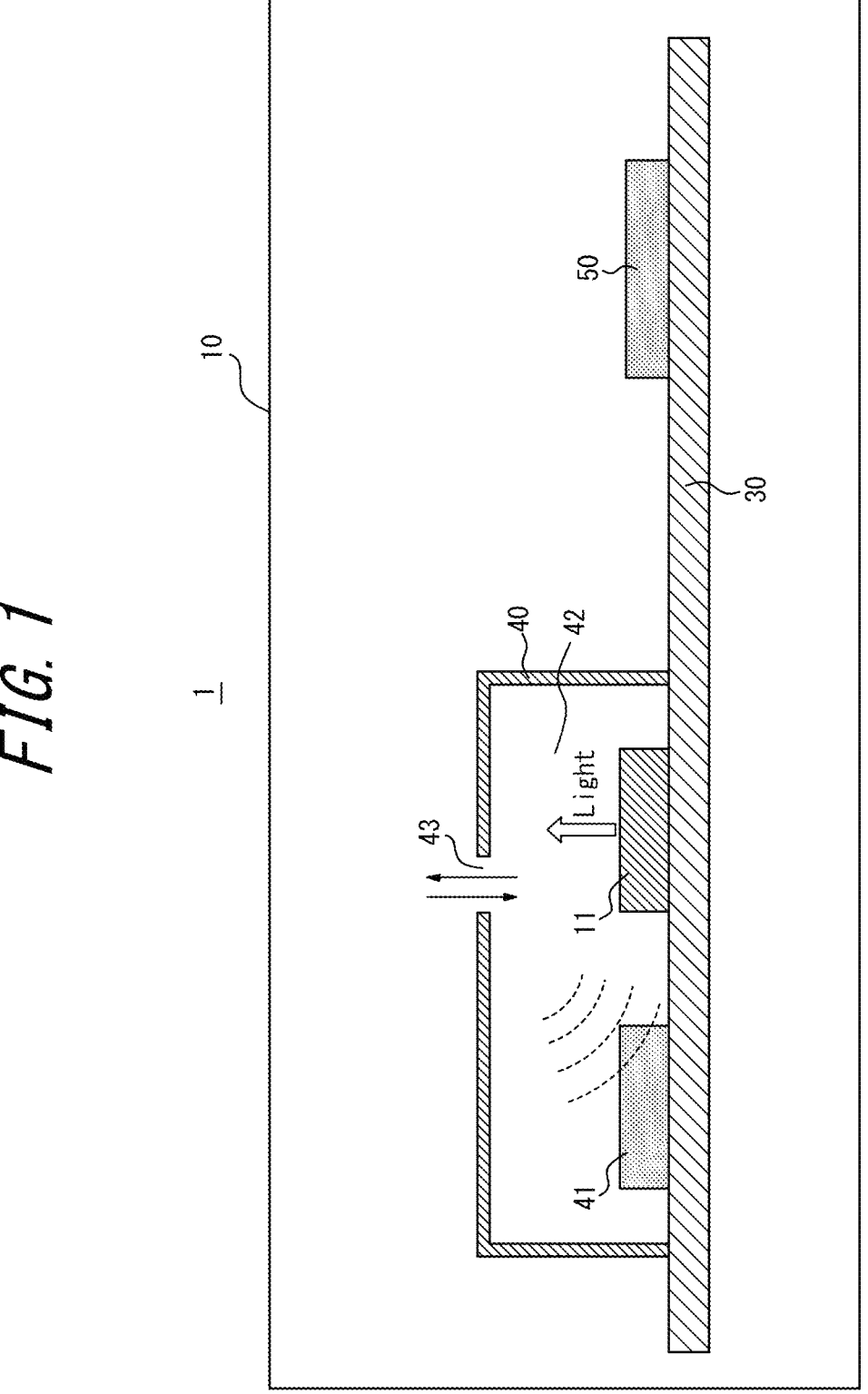
FIG. 1 is a diagram illustrating a configuration example of a gas sensor according to the present embodiment.

A gas sensor according to an embodiment of the present disclosure is described below with reference to the drawings. Identical or equivalent portions in the drawings are labeled with the same reference signs. In the explanation of the present embodiment, a description of identical or equivalent portions is omitted or simplified as appropriate.

(Gas Sensor)

FIG. 1 is a diagram illustrating a configuration of a gas sensor 1 according to the present embodiment. The gas sensor 1 includes a housing 10 and a gas measuring unit 40 disposed inside the housing 10. As in the present embodiment, the gas sensor 1 may include a substrate 30. The gas sensor 1 may also include a circuit 50. The gas measuring unit 40 includes a light source 11, a detector 41, and a gas detection space 42. Details of the constituent elements of the gas sensor 1 are described below. The gas measuring unit 40 is provided with a hole 43 through which gas (such as ambient air) passes, and gas is introduced into the gas detection space 42. The gas sensor 1 measures the presence or the concentration of a gas to be detected in the introduced gas. The gas to be detected can be a specific detection target gas, such as carbon dioxide, water vapor, carbon monoxide, nitrogen monoxide, ammonia, sulfur dioxide, alcohol, formaldehyde, methane, propane, or the like.

In the present embodiment, the gas measuring unit 40 is arranged inside the housing 10. A configuration without the housing 10 may, however, be adopted. The gas sensor 1 is configured to include the gas measuring unit 40 and the circuit 50 on the substrate 30. In the present embodiment, the gas measuring unit 40 is configured to include the light source 11 and the detector 41, which are provided on the substrate 30, and the gas detection space 42. The hole 43 may be provided in a part of the outer walls (side walls and ceiling) that partition the gas detection space 42 of the gas measuring unit 40. In the present embodiment, the hole 43 is provided in the ceiling among the outer walls that partition the gas detection space 42.

(Housing)

The housing 10 is the exterior of the gas sensor 1. The housing 10 may hold the substrate 30. The substrate 30 is attached to the housing 10, thereby fixing the position of the gas measuring unit 40. The housing 10 can be metal, glass, resin, or a composite of these materials. The resin can, for example, be phenolic resin, epoxy resin, polyimide resin, bismaleimide triazine resin, fluoropolymer resin, polyphenylene oxide resin, or the like.

(Substrate)

The substrate 30 has the function of holding the gas measuring unit 40. In the present embodiment, the substrate 30 also holds the circuit 50. The material of the substrate 30 is, for example, paper, glass cloth, polyimide film, PET film, ceramic, or the like.

(Gas Measuring Unit)

The gas measuring unit 40 detects the gas to be detected. In detail, the gas measuring unit 40 measures the presence or the concentration of the gas to be detected in the gas introduced into the gas detection space 42 and outputs an electrical signal indicating the measurement result. In the present embodiment, the gas measuring unit 40 measures the presence or the concentration of the gas to be detected using a photoacoustic method. The photoacoustic method measures the gas to be detected by using a high-performance microphone to pick up, as sound (pressure change), the vibrations of gas molecules that have absorbed light.

(Light Source)

The light source 11 emits light containing a wavelength absorbed by the gas to be detected. The light source 11 may be configured by a light-emitting element having a predetermined driving frequency. The light-emitting element may, for example, be an LED (Light Emitting Diode), a lamp, a laser (Light Amplification by Stimulated Emission of Radiation), an organic light-emitting element, a MEMS (Micro Electro Mechanical Systems) heater, or VCSEL (Vertical Cavity Surface Emitting LASER). In the present embodiment, the light source 11 is an LED (infrared LED) that emits infrared light and has a driving frequency of 200 Hz or more. To enable driving at a high frequency, the light source 11 is a quantum infrared LED that emits infrared light using electrons or holes in a semiconductor.

The wavelength of the infrared light may be 2 μm to 12 μm. The region of 2 μm to 12 μm is a wavelength band that is particularly suitable for use in the gas sensor 1 due to the presence of a large number of absorption bands that are characteristic of various gases. For example, an absorption band for methane is present at a wavelength of 3.3 μm, an absorption band for carbon dioxide is present at a wavelength of 4.3 μm, and an absorption band for alcohol (ethanol) is present at a wavelength of 9.5 μm.

(Detector)

During measurement of the concentration of the gas to be detected in the gas (air) in the gas detection space 42, the detector 41 detects changes in accordance with the amount of the gas to be detected. The light emitted from the light source 11 passes through the gas detection space 42 and is absorbed according to the amount of the gas to be detected. The detector 41 detects a signal based on the light emitted from the light source 11. In the present embodiment, the detector 41 is a microphone. In the photoacoustic gas sensor 1, the vibration sound of the gas molecules in the gas to be detected that has absorbed light corresponds to a signal based on light.

(Gas Detection Space)

The gas detection space 42 has a space separated by an outer wall and functions to contain a gas, such as air, in the interior space. The gas contained in the gas detection space 42 is replaced through a hole 43. The outer wall of the gas detection space 42 is formed of metal, resin, or the like.

(Hole)

The hole 43 is a hole provided in the outer wall of the gas detection space 42. Gas passes through the hole 43 and replaces the gas inside the gas detection space 42. There may be more than one hole 43. Here, the hole 43 may be provided with a dust filter for dust prevention. The hole 43 may be additionally provided with a tubular ventilation pipe. The ventilation pipe has the function of restricting the space through which the gas is vented and directing the gas into the gas detection space 42.

(Circuit)

The circuit 50 may control the entire gas sensor 1. For example, the circuit 50 may perform arithmetic processing on the output signal from the gas measuring unit 40 to obtain the concentration of the gas to be detected. The circuit 50 may drive the light source 11. The circuit 50 may be configured to include one or more processors. The processor may, for example, be a general purpose processor or a dedicated processor specialized for particular processing, but these examples are not limiting. Any appropriate processor may be used.

(Gas Sensor Design)

Here, since the photoacoustic gas sensor 1 generally picks up sound with a microphone, noise in the operating environment affects the detection accuracy. If there is a device such as an air conditioner in the environment where the gas sensor 1 is used, the device may emit noise with a peak around 100 Hz, for example. Therefore, to detect the gas to be detected with high accuracy, the effect of noise needs to be avoided. The gas detection space 42 is provided as an inner space partitioned by an outer wall into a nearly cuboid structure (cell), for example. Therefore, the resonance mode of the cell can be used to increase the sound picked up by the microphone, thereby increasing the measurement accuracy. The avoidance of the effect of noise and the use of the resonance mode are explained in turn below.

Figure 2:
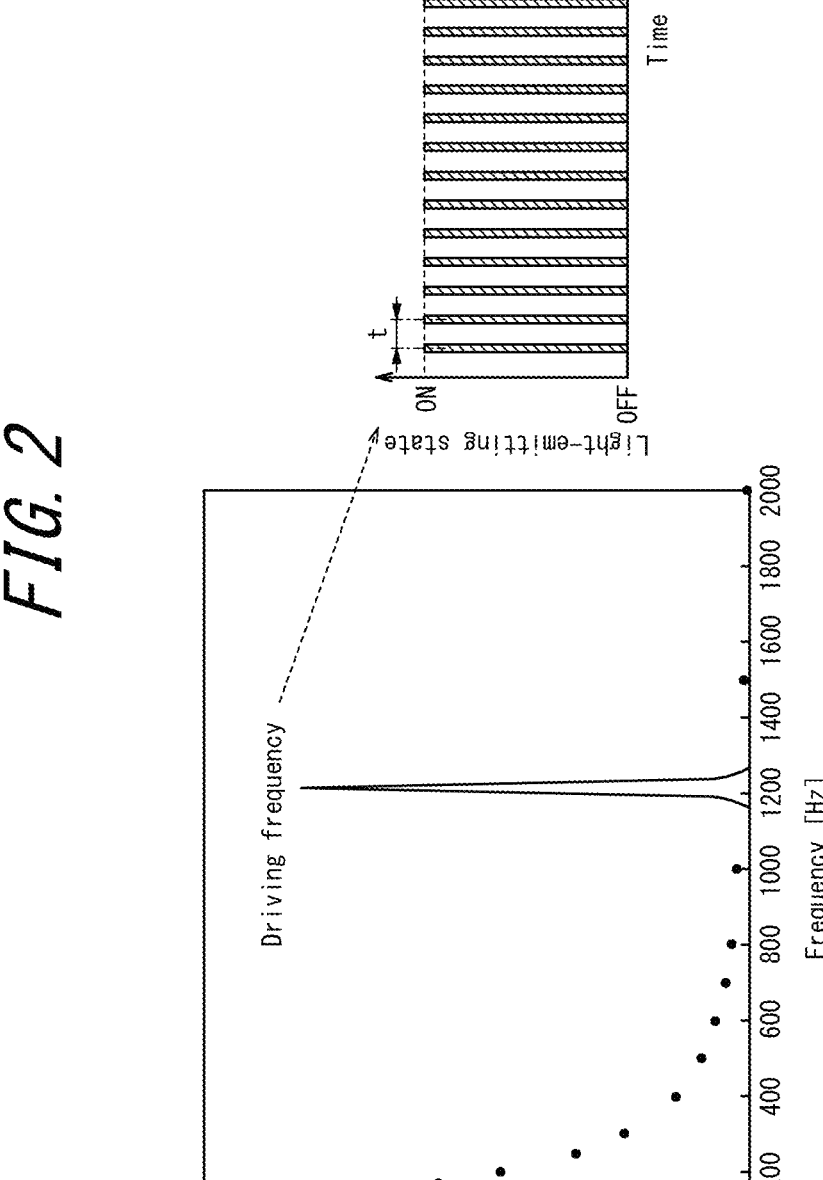
FIG. 2 is a diagram illustrating an example of setting the driving frequency of a light source.

FIG. 2 is a diagram illustrating an example of setting the driving frequency of the light source 11. The dotted curve on the left side of FIG. 2 illustrates the numerical calculation results of the noise energy intensity in the operating environment of the gas sensor 1. As a model for the sound (noise) emitted from the vibration source, measured noise data from the air blower of an indoor unit Hitachi room air conditioner "RAS-AJ36D (W)" operating in heating mode was used. The vertical axis represents the noise energy intensity normalized by the maximum value. The horizontal axis represents frequency, and the noise energy intensity for each frequency component is illustrated. By setting the driving frequency of the light source 11 to a frequency band away from the peak noise energy intensity, the effect of noise in the operating environment can be avoided. In the example in FIG. 2, there is a sharp intensity peak near 100 Hz. The driving frequency of the light source 11 may therefore be set to 200 Hz or more. For further separation from the peak noise energy intensity, the driving frequency of the light source 11 may be 1 kHz or more, or 10 kHz or more.

If the light-emission state of the light source 11 is defined such that the light-emitting state is ON and the non-light-emitting state is OFF, then the driving frequency of the light source 11 is determined by the ON interval. In the present embodiment, a driving current is periodically applied to the light source 11, which is an infrared LED, and the light source 11 periodically switches between ON and OFF. The ON interval is indicated by a period t in the right side of FIG. 2. The driving frequency of the light source 11 is given by the reciprocal of the period t. Here, the duty ratio (ON time relative to the period t) is not limited but may, for example, be 30%.

The shape of the gas measuring unit 40 is not limited to a specific shape but can be a cuboid, cube, cylinder, sphere, hemisphere, ellipsoid, semi-ellipsoid (ellipsoid cut in half), or the like with a hole 43 in a portion thereof. In the example in FIG. 1 or FIG. 4, for example, a cuboid or cube that is approximately defined with respect to the gas measuring unit 40 can be determined. The gas measuring unit 40 includes the gas detection space 42 and has a resonance mode that greatly amplifies sound waves of a specific frequency (natural frequency). The natural frequency f of the resonance mode is given by Equation (1) below, where $L_x$, $L_y$, $L_z$ are lengths of each side of the gas measuring unit 40, c is the speed of sound, and $n_x$, $n_y$, $n_z$ are any integer from 0 to 3. Here, one of $n_x$, $n_y$, $n_z$ is greater than 0 due to the presence of waves inside the gas measuring unit 40.

$$f = \frac{c}{2}\sqrt{\left(\frac{n_x}{L_x}\right)^2 + \left(\frac{n_y}{L_y}\right)^2 + \left(\frac{n_z}{L_z}\right)^2} \qquad \text{Equation (1)}$$

Here, $n_x$, $n_y$, $n_z$ may include natural numbers 4 and above, but mainly the base mode of resonance ($n_x+n_y+n_z=1$), the first order mode ($n_x+n_y+n_z=2$) and the second order mode ($n_x+n_y+n_z=3$) are considered. The gas measuring unit 40 may be a cube, in which case the length L of one side ($L=L_x=L_y=L_z$) is used to calculate the natural frequency of the resonance mode according to Equation (1). The length L of one side may be the effective length. In a case in which the gas measuring unit 40 is not a cube, L may be given by the following Equation (1) using the volume V of the gas detection space 42. In other words, L may be given as the cubic root of V.

$$L_i = \sqrt[3]{V}, i \in \{x, y, z\} \qquad \text{Equation (2)}$$

Figure 3:
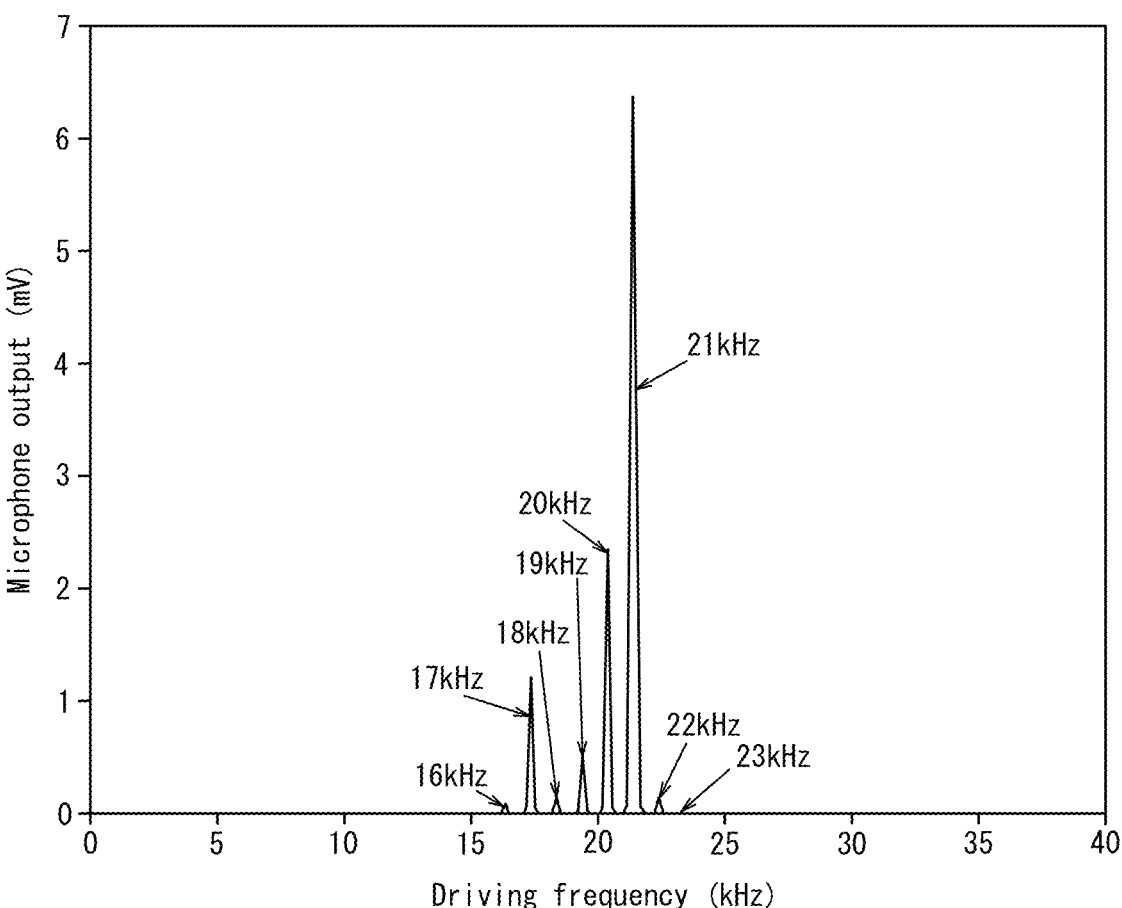
FIG. 3 is a diagram illustrating the change in microphone output when the driving frequency is varied.

FIG. 3 is a diagram illustrating the change in microphone (detector 41) output when the driving frequency of the light source 11 is varied. The gas measuring unit 40 used in the experiment in FIG. 3 had a size of 1.06×0.96×0.85 cm³ and had a hole 43 with a 1 mm diameter. A driving current of 350 mA was periodically applied to the light source 11, which is an infrared LED, and the duty ratio was 30%. The driving frequency was varied from 16 kHz to 23 kHz in 1 kHz increments, and the microphone output was greater at 21 kHz than at other driving frequencies. This is thought to be because the driving frequency became substantially equal to the natural frequency of the resonance mode of the gas measuring unit 40. In other words, by determining the driving frequency based on the natural frequency of the resonance mode of the gas measuring unit 40, the microphone can pick up loud sound based on the vibration of the gas molecules that absorbed light. The effect of noise can therefore be further reduced, and the gas to be detected can be detected with high accuracy. Here, it is not necessary for the driving frequency to perfectly match the natural frequency of the resonance mode. For example, a deviation of −1 kHz to +1 kHz from the natural frequency of the resonance mode is considered sufficient to improve accuracy. In the present embodiment, the natural frequency of the resonance mode of the gas measuring unit 40 is f, and the driving frequency of the light source 11 is from 0.9f or more to 1.1f or less. Similarly, it is sufficient that the region of the peak half-width centered on the peak of the driving frequency of the light source 11 and the region of the peak half-width centered on the peak of the natural frequency of the resonance mode overlap. The peak half-width is the width of the wavelength when the height (magnitude) of the peak is half.

In a case in which the presence or the concentration of the gas to be detected is measured by the photoacoustic method, the detector 41 can be a microphone with a vibrating membrane. In this case, the resonance frequency of the vibrating membrane may be substantially identical to the driving frequency of the light source 11 so that the output of the microphone becomes even greater. Here, it suffices to satisfy one of two conditions to be substantially identical: the region of the peak half-width centered on the peak of the resonance frequency of the vibrating membrane and the region of the peak half-width centered on the peak of the resonance frequency of the light source 11 overlap, or the driving frequency of the light source 11 is from 0.9F or more to 1.1F or less, F being the resonance frequency of the vibrating membrane.

Here, the light source 11 or the detector 41 is preferably located at the center or the end of a cuboid or a cube that is approximately defined with respect to the gas measuring unit 40. As described below, a distribution of sound pressure is generated in the gas detection space 42 by driving of the light source 11. The light source 11 and the detector 41 are preferably each arranged in a region that is 70% or more of the maximum absolute value of the sound pressure, more preferably 80% or more. In plan view looking at the main surface of the substrate 30 in front, the light source 11 and the detector 41 may be arranged at point symmetrical positions with respect to the center of the gas measuring unit 40 or at line symmetrical positions with respect to a line passing through the center of the gas measuring unit 40. In this case, the light source 11 and the detector 41 may be separated by one third or more, more preferably half or more of the maximum length of the gas measuring unit 40 in plan view. One of the light source 11 or the detector 41 may be arranged at the center of the gas measuring unit 40 in plan view looking at the main surface of the substrate 30 in front. The other one of the light source 11 or the detector 41 may be arranged at a distance from the center of the gas measuring unit 40. The distance by which the other one of the light source 11 or the detector 41 is separated from the center of the gas measuring unit 40 is preferably at least one-fourth of the maximum length of the gas measuring unit 40 in plan view, more preferably at least one-third. Here, the maximum length of the gas measuring unit 40 is the maximum length of the gas measuring unit 40 in plan view, which is defined by the length of the diagonal if the gas measuring unit 40 is a rectangle or a square, the diameter if the gas measuring unit 40 is a circle, or the major axis if the gas measuring unit 40 is an ellipse. The position of the light source 11 may be defined by a position somewhere in the emission area if the light source 11 is an LED. The position of the detector 41 may be defined by a position somewhere in an intake hole if the detector 41 is a microphone. For example, if a position somewhere in the emission area of the LED and a position somewhere in an intake hole of the microphone are separated by one third or more, more preferably half or more of the maximum length of the gas measuring unit 40 in plan view, the aforementioned condition may be considered to be satisfied.

Figure 4:
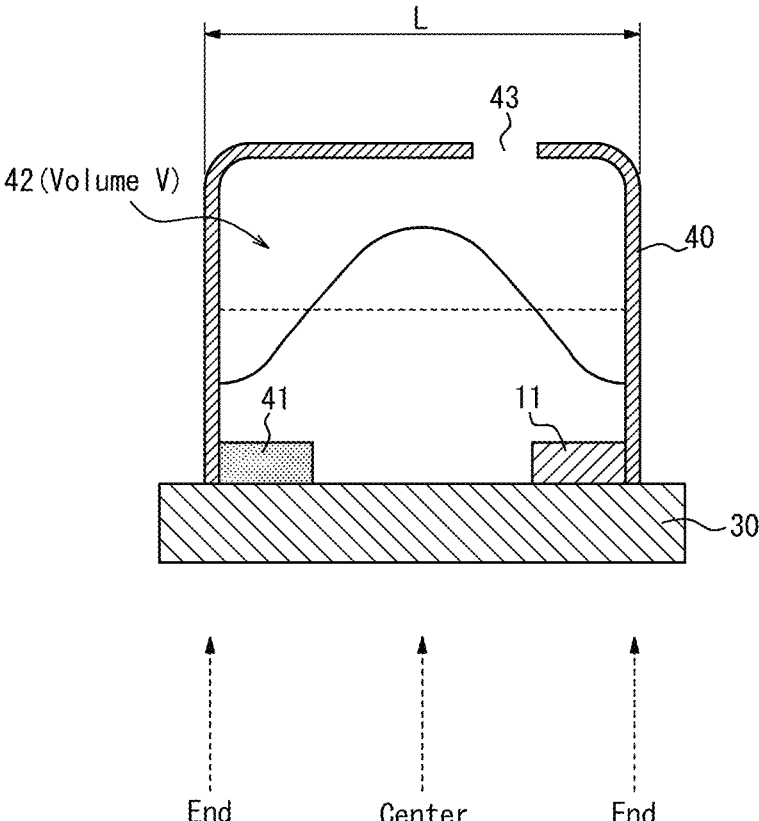
FIG. 4 is a diagram illustrating the center and ends of the gas measuring unit.
Figure 5:
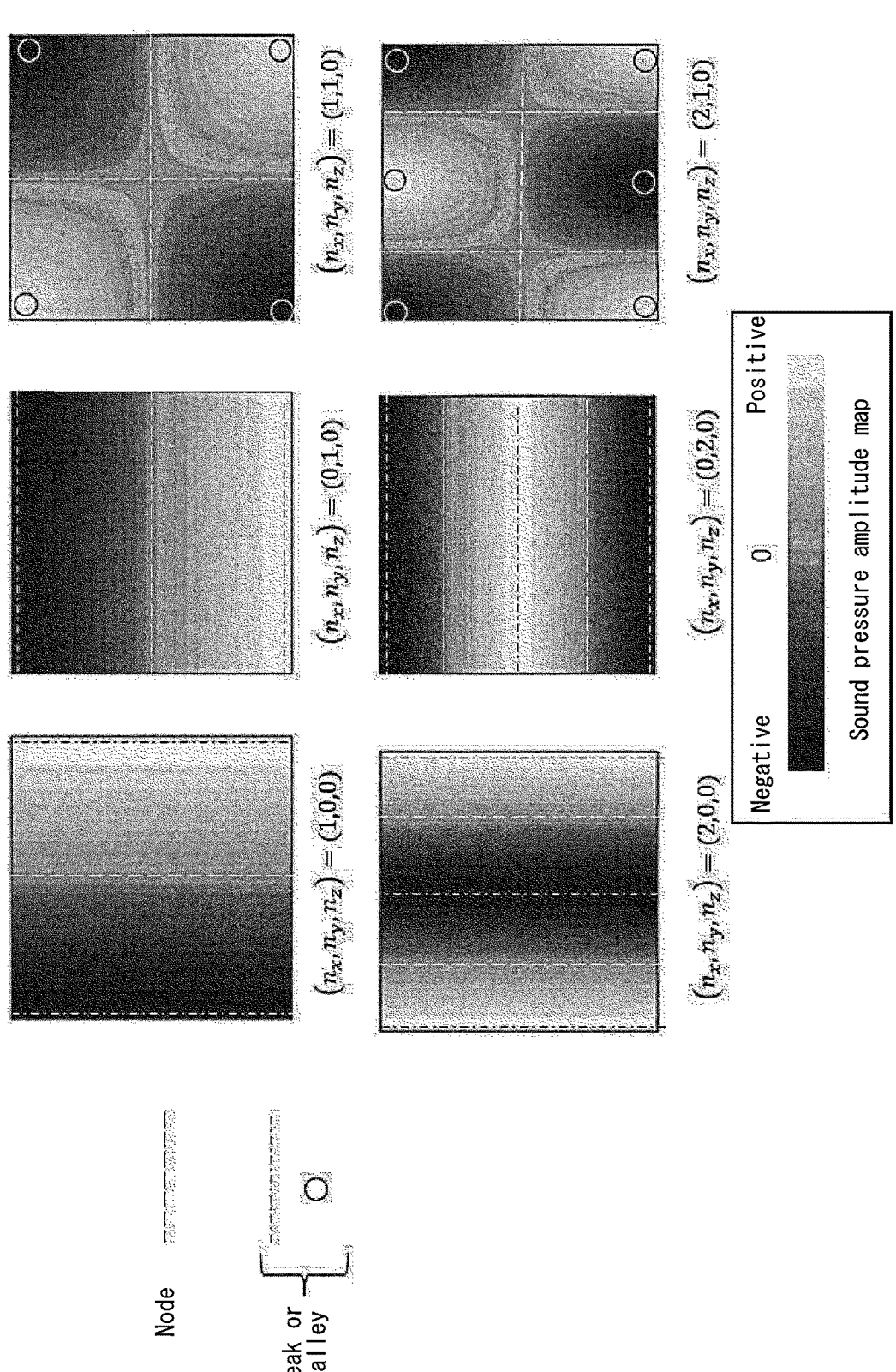
FIG. 5 is a diagram illustrating the sound pressure distribution in the case of a cuboid.

As illustrated in FIG. 4, an approximate cuboid or cubic gas measuring unit 40 can be treated as a resonance box. The resonance mode increases the vibration of the gas, but if the light source 11 or the detector 41 is located at a position of a node of the resonance mode (where there is no fluctuation), the detector 41 is not provided any vibration, which leads to a degradation of detection accuracy. Therefore, to improve the detection accuracy of the gas to be detected, the light source 11 or the detector 41 is preferably removed from the node position of the resonance mode and preferably placed at the position of a peak or valley. Placing the light source 11 and the detector 41 at the position of a peak or valley of the resonance mode increases the sound pressure that is generated and detected, thereby increasing the detection accuracy of the gas to be detected. Such a position of a peak or valley may be obtained as extreme values of the sound pressure and may be a region that includes the extreme values and is a neighborhood of 70% or more of the absolute value of the sound pressure at the extreme values. Placing the light source 11 or the detector 41 at this position yields the effect of detecting the gas to be detected with high accuracy. The position of the peak or valley is more preferably a region that is a neighborhood of 80% or more of the absolute value. Furthermore, the position of such a node may also be obtained as the position where the sound pressure is zero, and may be a region that includes the position where the sound pressure is zero and is a neighborhood of 30% or less of the maximum absolute value of the sound pressure. Placing the light source 11 or the detector 41 at a position other than this position yields the effect of detecting the gas to be detected with high accuracy. The position of the node is more preferably a region that is a neighborhood of 20% or less of the absolute value. Here, the location of the nodes can be determined by design, since the shape of low order modes of the resonance mode is clear. In the following, the base mode and the first order mode are considered as low order modes. Specifically, when the shape of the gas measuring unit 40 is a cuboid, cube, cylinder, sphere, or ellipse, the symmetry plane, symmetry axis, or center of the gas measuring unit 40 is a node of the resonance mode of sound pressure. In the example in FIG. 4, positions that are L/4 from the side walls (a pair of opposing surfaces) that define the gas detection space 42 are nodes. The centers of the side walls defining the gas detection space 42 may also be nodes. The side walls defining the gas detection space 42 may also be the position of a peak or valley. To cause the resonance mode to degenerate and resonate more strongly, the gas measuring unit 40 is preferably a cuboid having two orthogonal sides of the same length. For the same reason, the gas measuring unit 40 is more preferably a cube. Since the sound pressure inside the gas measuring unit 40 satisfies the Helmholtz equation, and furthermore, since gas near the wall does not move in the wall direction, the sound pressure satisfies the boundary condition of no gradient perpendicular to the wall surface, i.e., Equation (3). More specifically, in a case in which the gas measuring unit 40 is a cuboid with side lengths of $L_x$, $L_y$, $L_z$, the sound pressure p generated inside the cuboid is given by Equation (4) below, where the sound pressure is the peak and valley of a cosine function at the position of the wall. The natural frequency f is obtained as Equation (1) by substituting Equation (4) into Equation (3), where x, y, and z are values of orthogonal coordinates. The z direction is positive in the direction in which the gas measuring unit 40 is perpendicular to the substrate 30. The xy directions are parallel to each side of the cuboid gas measuring unit 40 and are selected to form a right-handed system. The origin is a point at a corner of the cuboid gas measuring unit 40. A and B are appropriate constants, and t represents time. The positions of the peaks, valleys, and nodes of this function determine the preferred position of the light source 11 or the detector 41. The positions of the nodes are given by Equation (5). The positions of the peaks and valleys are given by Equation (6). FIG. 5 illustrates an example of numerical calculation of the interior sound pressure distribution in the case of the gas measuring unit 40 being a cuboid. Here, FIG. 5 is a cross-section of the gas measuring unit 40 at any value of z in a plane parallel to the xy-plane.

$$\Delta p + \frac{(2\pi f)^2}{c^2} p = 0, \nabla p \cdot n = 0 \qquad \text{Equation (3)}$$

$$p = A \cos (n_x \pi x / L_x) \cos (n_y \pi y / L_y) \cos (n_z \pi z / L_z) \sin (-2\pi f t + B) \qquad \text{Equation (4)}$$

$$n_i \in N, \ i \in \{x, y, z\}$$

$$x_i = \frac{2m+1}{n_i} L_i, \ m \in N \qquad \text{Equation (5)}$$

$$x_i = \frac{2m}{n_i} L_i, \ m \in N \qquad \text{Equation (6)}$$

Figure 6:
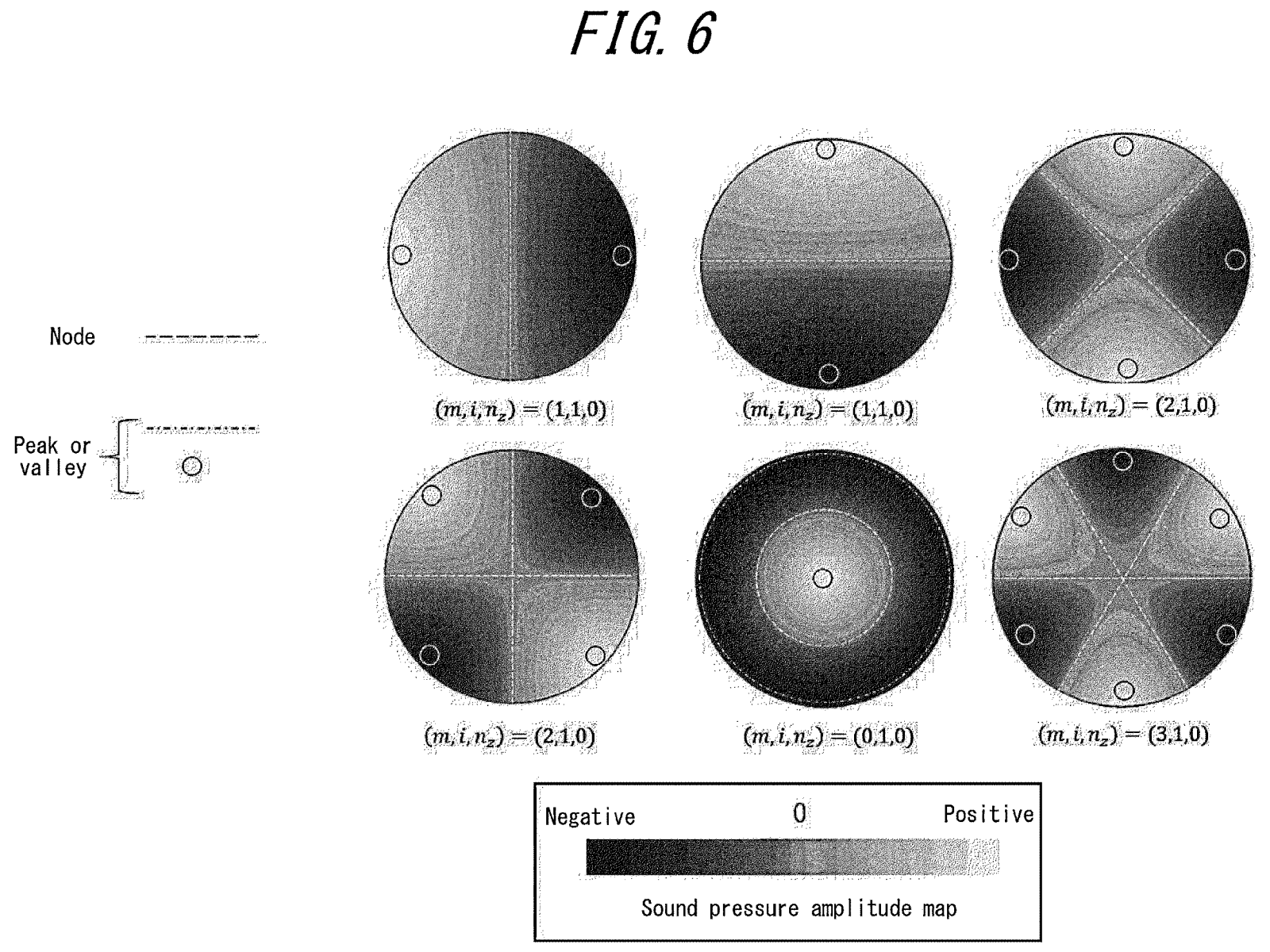

In a case in which the gas measuring unit 40 is provided as a cylinder, the solution can be constructed analytically as in Equation (7) by solving for the sound pressure p in Equation (4) as a Laplace operator in cylindrical coordinates. $J_m$ is a first type Bessel function of order m. R is the radius of the cylinder. $\tau_{mi}$ is the coordinate value of the point at which the $i^{th}$ gradient (derivative), counting from 0, of the first type Bessel function of order m becomes 0, so as to satisfy the boundary condition in Equation (3). In other words, $\tau_{mi}$ is the coordinate value of the $i^{th}$ zero point, counting from 0, of the derivative of the first type Bessel function. Here, even if the derivative is zero, the origin 0 is not included. m and $n_z$ are natural numbers. r is the coordinate value in the radial direction from the center of the cylinder. 0 is the azimuth from the center of the cylinder. $L_{ez}$ is the height of the cylinder. A and B are appropriate constants. FIG. 6 illustrates an example of numerical calculation of the interior sound pressure distribution in the case of the gas measuring unit 40 being a cylinder. Here, FIG. 6 is a cross-section of the gas measuring unit 40 at any value of z in a plane parallel to the xy-plane. In a case in which the gas measuring unit 40 is a cylinder, there exists a resonance mode such that the positions of the peaks and valleys of the sound pressure p are located at the center of the cylinder and the wall of the cylinder. By placing the detector 41 or the light source 11 at these positions, a strong sound pressure can be detected, and the gas to be detected can be detected with high accuracy. There also exists a resonance mode such that the positions of the peaks and valleys of the sound pressure p are at opposite positions on the wall of the cylinder. By placing the detector 41 or the light source 11 at these opposite positions, a strong sound pressure can be detected, and the gas to be detected can be detected with high accuracy. There also exists a resonance mode such that the positions of the peaks and valleys of the sound pressure p are located every 90° from the center on the circular wall, which is the edge of the cylinder. By placing the detector 41 or the light source 11 at one of these positions, a strong sound pressure can be detected, and the gas to be detected can be detected with high accuracy. The natural frequency f is obtained as Equation (8) by substituting Equation (7) into Equation (3). As approximate values, $\tau_{11}$ is about 1.84, 121 is about 3.05, and $\tau_{01}$ is about 3.83. In the case of a resonance mode with waves only in the height direction and no waves in the cylindrical radial direction, $\tau_{mi}$ is set to zero, $J_m$ is a constant value, and $n_z$ is 1 or more.

$$p = A J_m \left( \frac{\tau_{mi}}{R} r \right) \sin(m\theta) \cos(n_z \pi z / L_{cz}) \sin(-2\pi f t + B) \ \text{or}$$

-continued $$p = AJ_m\left(\frac{\tau_{mi}}{R}r\right)\sin(m\theta)\cos(n_z\pi z/L_{cz})\sin(-2\pi ft + B)$$ Equation (7)

$$f = \frac{c}{2\pi}\sqrt{\left(\frac{\tau_{mi}}{R}\right)^2 + \left(\frac{n_z\pi}{L_z}\right)^2}$$ Equation (8)

Figure 7:
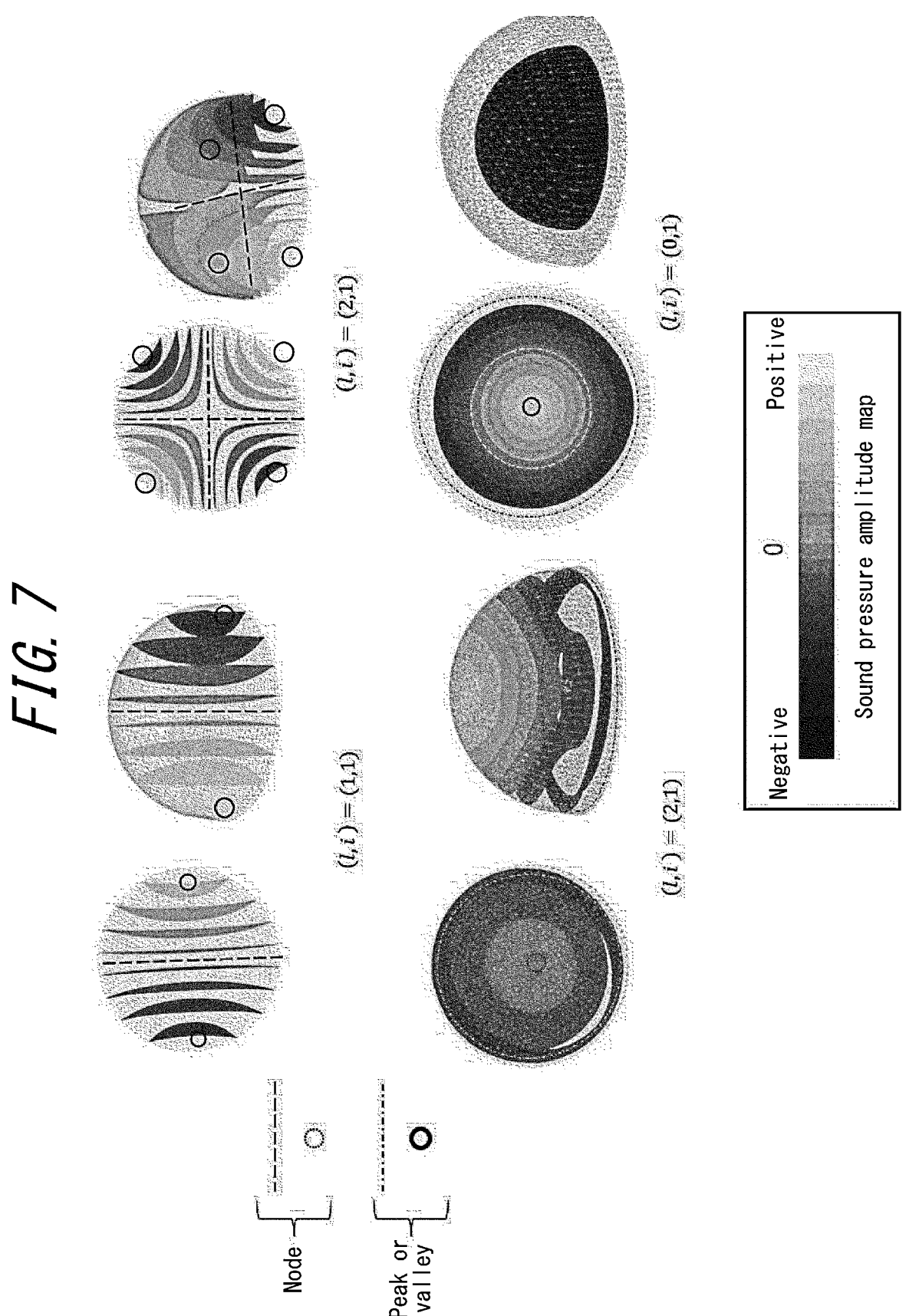
FIG. 7 is a diagram illustrating the sound pressure distribution in the case of a hemisphere.

In a case in which the gas measuring unit 40 is a hemisphere, the sound pressure p in Equation (3) can be solved analytically as a Laplace operator in spherical coordinates as in Equation (9), and the sound pressure p is constructed as the real or imaginary part of these functions. $j_1$ is a first-order spherical Bessel function. R is the radius of the hemisphere from the center of the circle at the base of the hemisphere. un is the coordinate value of the point at which the $i^{th}$ gradient, counting from 0, of the spherical Bessel function of order I becomes 0, so as to satisfy the boundary condition in Equation (3). $Y_{1m}$ is the spherical harmonic function of order 1, m. 1 and m are integers. r is the coordinate value in the radial direction from the center of the circle at the base of the hemisphere. $\theta$ is the polar angle. $\phi$ is the azimuth. The spherical harmonic functions are limited by the boundary condition of the hemisphere to those for which the top and bottom are symmetrical with respect to the base of the hemisphere. A and B are appropriate constants. FIG. 7 illustrates an example of numerical calculation of the interior sound pressure distribution in the case of the gas measuring unit 40 being a hemisphere. In a case in which the gas measuring unit 40 is a hemisphere, there exists a resonance mode such that the positions of the peaks and valleys of the sound pressure p are located at the center of the base of the hemisphere and at the circular edge of the base of the hemisphere. By placing the detector 41 or the light source 11 at these positions, a strong sound pressure can be detected, and the gas to be detected can be detected with high accuracy. There also exists a resonance mode such that the positions of the peaks and valleys of the sound pressure p are at opposite positions on the wall, which is the circular edge of the base of the hemisphere. By placing the detector 41 or the light source 11 at these opposite positions, a strong sound pressure can be detected, and the gas to be detected can be detected with high accuracy. There also exists a resonance mode such that the positions of the peaks and valleys of the sound pressure p are located every 90° from the center on the circular wall, which is the circular edge of the base of the hemisphere. By placing the detector 41 or the light source 11 at one of these positions, a strong sound pressure can be detected, and the gas to be detected can be detected with high accuracy. The natural frequency f is obtained as Equation (10) by substituting Equation (9) into Equation (3). As approximate values, un is about 2.09, $\mu_{21}$ is about 3.34, and $\mu_{01}$ is about 4.49.

$$p = Aj_1\left(\frac{\mu_{li}}{R}r\right)Y_{lm}(\theta, \phi)\sin(-2\pi ft + B)$$ Equation (9)

$$f = \frac{c}{2\pi}\frac{\mu_{li}}{R}$$ Equation (10)

As described above, the gas sensor 1 according to the present embodiment can detect the gas to be detected with high accuracy, since the driving frequency of the light source 11 is determined based on the natural frequency of the resonance mode of the gas measuring unit 40 to avoid the effect of noise.

Although an embodiment of the present disclosure has been described based on the various drawings and examples, it should be noted that a person of ordinary skill in the art could easily make various modifications and revisions based on the present disclosure. Accordingly, such modifications and revisions should also be considered to be included within the scope of the present disclosure. In the above embodiment, the gas sensor 1 that is an apparatus has been described, but a gas measurement method to be executed by the gas sensor 1, for example, is included in the scope of the present disclosure. For example, a gas measurement method to be executed by the gas sensor 1 may include setting the driving frequency of the light source 11 to be from 0.9f or more to 1. If or less, f being the natural frequency of the resonance mode of the gas measuring unit 40, or setting the region of the peak half-width centered on the peak of the driving frequency of the light source 11 and the region of the peak half-width centered on the peak of the natural frequency of the resonance mode overlap. The setting may be performed by a control apparatus (for example, a processor) provided in the gas sensor 1, or an external apparatus (for example, a computer) capable of controlling the gas sensor 1, functioning as a driving frequency setting unit.

The invention claimed is:

1. A gas sensor comprising:

a gas measuring unit including a light source provided on a substrate, a detector provided on the substrate and configured to detect a signal based on light emitted from the light source, and a gas detection space provided with a hole for gas to pass through, wherein a natural frequency of a resonance mode of the gas measuring unit is f, and a driving frequency of the light source is from 0.9f or more to 1.1f or less, a distribution of sound pressure is generated in the gas detection space by driving of the light source, and the light source and the detector are each arranged in a region that is 70% or more of a maximum absolute value of the sound pressure.

2. The gas sensor according to claim 1, wherein in plan view looking at a main surface of the substrate in front, the light source and the detector are arranged at point symmetrical positions with respect to a center of the gas measuring unit or at line symmetrical positions with respect to a line passing through the center of the gas measuring unit, and the light source and the detector are separated by one third or more of a maximum length of the gas measuring unit in plan view.

3. The gas sensor according to claim 1, wherein in plan view looking at a main surface of the substrate in front, one of the light source or the detector is arranged at a center of the gas measuring unit, and the other of the light source or the detector is arranged to be separated from the center of the gas measuring unit by a distance of at least a quarter of a maximum length of the gas measuring unit in the plan view.

4. The gas sensor according to claim 1, wherein the light source is a light-emitting element with a driving frequency of 200 Hz or more.

5. The gas sensor according to claim 1, wherein the natural frequency f of the resonance mode is given by Equation (1), $$f = \frac{c}{2}\sqrt{\left(\frac{n_x}{L_x}\right)^2 + \left(\frac{n_y}{L_y}\right)^2 + \left(\frac{n_z}{L_z}\right)^2}$$ Equation (1)

where $L_x$, $L_y$, $L_z$ are lengths of each side of the gas measuring unit, c is the speed of sound, $n_x$, $n_y$, $n_z$ are any integer from 0 to 3, and one of $n_x$, $n_y$, $n_z$ is greater than 0.

6. The gas sensor according to claim 5, wherein the lengths of each side of the gas measuring unit $L_x$, $L_y$, $L_z$ are given by Equation (2), $$L_i = \sqrt[3]{V}, \; i \in \{x, y, z\} \qquad \text{Equation 2}$$

where V is a volume of the gas detection space.

7. The gas sensor according to claim 1, wherein the gas measuring unit is a cuboid having two orthogonal sides of identical length.

8. The gas sensor according to claim 1, wherein the gas measuring unit is a cube.

9. The gas sensor according to claim 1, wherein the gas measuring unit is cylindrical or hemispherical.

10. The gas sensor according to claim 9, wherein the gas measuring unit is cylindrical, and the natural frequency f of the resonance mode is given by Equation (3), $$f = \frac{c}{2\pi}\sqrt{\left(\frac{\tau_{mi}}{R}\right)^2 + \left(\frac{n_z\pi}{L_z}\right)^2} \qquad \text{Equation (3)}$$

where $L_{cz}$ is a height and R is a radius of the gas measuring unit; c is the speed of sound; $\tau_{mi}$ is a coordinate value of a point at which an $i^{th}$ derivative, counting from 0, of a first type Bessel function of order 0 or m is 0; m, i, and $n_z$ are integers from 0 to 3; and either $\tau_{mi}$ or $n_z$ is greater than 0.

11. The gas sensor according to claim 9, wherein the gas measuring unit is hemispherical, and the natural frequency f of the resonance mode is given by Equation (4), $$f = \frac{c}{2\pi}\frac{\mu_{li}}{R} \qquad \text{Equation (4)}$$

where R is a radius of the gas measuring unit, c is the speed of sound, $\mu_{li}$ is a coordinate value of a point at which an $i^{th}$ slope, counting from 0, of a spherical Bessel function of order 1 is 0, and I and i are integers from 0 to 3.

12. The gas sensor according to claim 9, wherein the light source or the detector is located at a center or an end of a cylinder or a hemisphere that is approximately defined with respect to the gas measuring unit.

13. The gas sensor according to claim 1, wherein the driving frequency is 1 kHz or more.

14. The gas sensor according to claim 1, wherein the driving frequency is 10 kHz or more.

15. The gas sensor according to claim 1, wherein the detector is a microphone with a vibrating membrane, a resonance frequency of the detector is substantially identical to the driving frequency, and presence or a concentration of a gas to be detected is measured by a photoacoustic method.

16. The gas sensor according to claim 1, wherein the light source is a quantum light-emitting element.

17. The gas sensor according to claim 1, wherein the light source or the detector is located at a center or an end of a cuboid or a cube that is approximately defined with respect to the gas measuring unit.

18. A gas measurement method to be executed by a gas sensor, the gas sensor including a gas measuring unit that includes a light source provided on a substrate, a detector provided on the substrate and configured to detect a signal based on light emitted from the light source, and a gas detection space provided with a hole for gas to pass through, the gas measurement method comprising:

setting a driving frequency of the light source to be from 0.9f or more to 1.1f or less, f being a natural frequency of a resonance mode of the gas measuring unit, wherein in the gas sensor, a distribution of sound pressure is generated in the gas detection space by driving of the light source, and the light source and the detector are each arranged in a region that is 70% or more of a maximum absolute value of the sound pressure.

\* \* \* \* \*